M. G. PICKETT.
Car-Brakes.
No. 149,881.  Patented April 21, 1874.
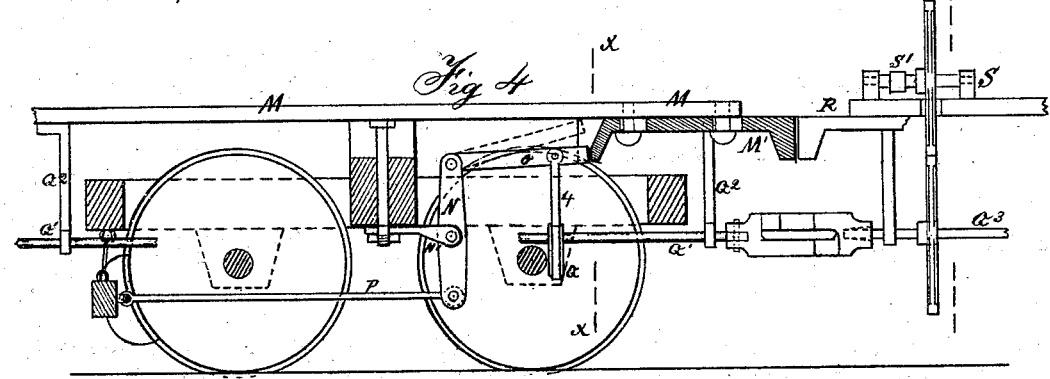
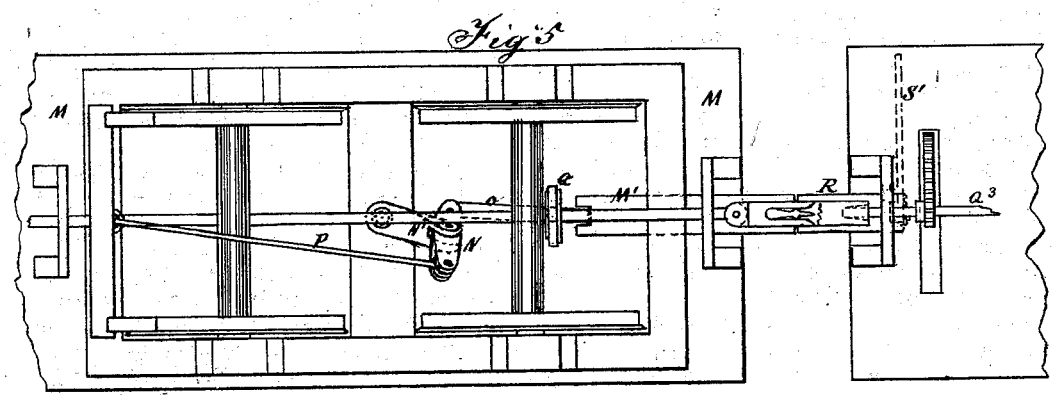
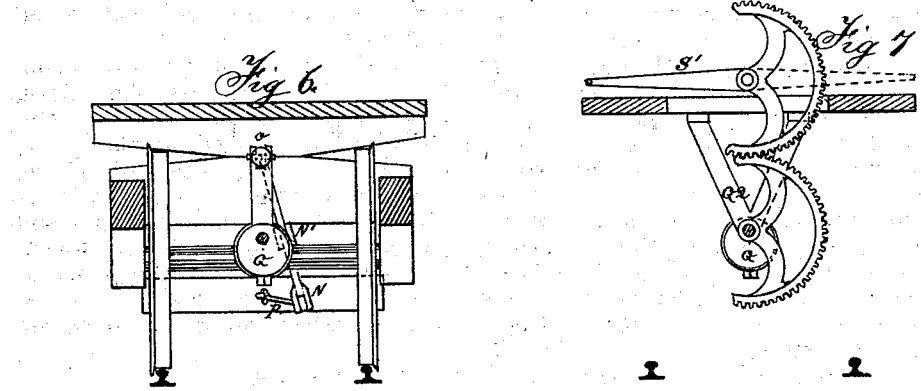
Witnesses.  Inventor.

UNITED STATES PATENT OFFICE.

MUNSON G. PICKETT, OF KINGSTON, CANADA.

IMPROVEMENT IN CAR-BRAKES.

Specification forming part of Letters Patent No. 149,881, dated April 21, 1874; application filed December 2, 1871.

*To all whom it may concern:*

Be it known that I, MUNSON G. PICKETT, of Kingston, Kings county, New Brunswick, in the Dominion of Canada, have invented an Improved Car-Brake, of which the following is a specification:

The object of the invention is to construct a brake for cars, &c., which may be operated by the retarding or stopping of the motive power at the will of the driver.

Figure 4 is a vertical longitudinal section of the front truck of a railroad-car having the improved brake attached and the rear portions of the tender, the brake shown in operation; Fig. 5, a bottom view of Fig. 4; Fig. 6, a vertical transverse section in line $x\,x$ of Fig. 4; Fig. 7, a vertical transverse section through the rear end of the tender in line $y\,y$ of Fig. 4.

Figs. 4, 5, 6, and 7 represent the improved brake adapted to a railroad-train, the rear end of the tender and the front truck of the first car being shown. Letter M represents a portion of the bottom frame of the body of the car, which is provided at its end with a sliding piece, $M^1$. N is a lever, whose fulcrum $N^1$ is fastened to the king-bolt of the truck, or in any convenient manner, to the bottom of the body of the car. The upper end of this lever N is hinged to a bar, O, and the lower end connects with the brake of the wheels of the truck by a rod, P. The bar O receives a slight motion up and down by an eccentric, 2, which is fastened upon a long shaft, $2^1$, which runs along under the bottom of the cars, and is supported by bearings $2^2\,2^2$, the shaft being shown broken off in Fig. 4. The rear end of the tender is fitted with a sliding piece, R, which abuts against $M^1$ when the engine and its tender are retarded, and if the bar O is down its front end will butt against the rear end of said sliding piece $M^1$, and thus operate the brakes; when, however the bar O is up, which can be effected by turning the shaft $2^1$ and its eccentric 2 one-half of a revolution, the rear end of sliding piece $M^1$ would not reach the said bar O, its back motion being limited, and the brakes would not be operated, thus enabling the car to be run backward without operating the brakes. The turning of the shaft one-half of a revolution for the purpose of throwing the brakes in or out, is effected on the tender, there being a shaft, $2^3$, under its platform, which is coupled to the shaft $2^1$ of the first car by any convenient universal joint, which would accommodate itself to the curves of the track, and also allow of the necessary end play of the shafts. Another short shaft, S, is fixed upon the top of the platform of the tender, and may be geared together with the lower shaft $2^3$ by a pair of segment-gears, and by a hand-lever, S', fastened to the shaft S, the turning of the shaft $2^3$ and $2^1$ can be effected.

Each truck of each car of the train being fitted with the mechanism, as described above, and each car having a shaft, $2^1$, attached, and all these shafts being coupled together in the manner specified, it will be seen that all the brakes of the whole train can be caused to operate by the retarding of the locomotive and tender, and that by reversing the hand-lever S' on the tender, to the position shown dotted in Fig. 7, all the brakes of the train can be made inoperative when the train is to be run backward.

I claim as my invention—

The sliding pieces R and $M^1$, in combination with the lever $o$, bar G', eccentric G, and connection 4, all constructed substantially as set forth.

MUNSON G. PICKETT.

Witnesses:
ALBERT H. HOOK,
J. H. DARLINGTON.